United States Patent [19]

Mayne

[11] 4,437,999

[45] Mar. 20, 1984

[54] METHOD OF TREATING CONTAMINATED INSOLUBLE ORGANIC SOLID MATERIAL

[75] Inventor: Sherman T. Mayne, Goldhill, N.C.

[73] Assignee: Gram Research & Development Co., Charlotte, N.C.

[21] Appl. No.: 297,849

[22] Filed: Aug. 31, 1981

[51] Int. Cl.³ .................................................. C02F 1/32
[52] U.S. Cl. .................................... 210/748; 210/760; 252/625; 252/626
[58] Field of Search .............. 210/760, 748, 721, 722, 210/912, 908, 751; 252/625, 626, 631

[56] References Cited

U.S. PATENT DOCUMENTS

| | | | |
|---|---|---|---|
| 3,920,547 | 11/1975 | Garrison et al. | 210/760 |
| 4,049,552 | 9/1977 | Arff | 210/760 |
| 4,129,518 | 2/1978 | Huppert et al. | 252/626 |
| 4,145,396 | 3/1979 | Grantham | 252/626 |
| 4,230,571 | 10/1980 | Dadd | 210/760 |

FOREIGN PATENT DOCUMENTS 1517664  4/1971  Fed. Rep. of Germany .
51-102962  3/1976  Japan .
53-27264  3/1978  Japan .

*Primary Examiner*—Charles N. Hart
*Assistant Examiner*—Sharon T. Cohen
*Attorney, Agent, or Firm*—Richards, Shefte & Pinckney

[57] ABSTRACT

The method of feeding an insoluble organic solid material in the form of an organic resin or biological matter containing contaminating material such as radioactive waste from a nuclear facility or from treatment of animal or plant tissue in a laboratory or medical facility into a vessel containing water and to which ultraviolet light and ozone, preferably by sparging, are applied while the water is being agitated to distribute the ozone. The ozone oxidizes the organic resin or biological material, which disintegrates on oxidation substantially into water and carbon dioxide, leaving substantially no resin or biological material after treatment by the ultraviolet light and ozone for a prescribed period of time, and leaving the contaminant material as a precipitate or in solution in the remaining water or as an escaping gas, in any of which forms it can be readily separated from the water for disposal or further treatment.

19 Claims, No Drawings

METHOD OF TREATING CONTAMINATED INSOLUBLE ORGANIC SOLID MATERIAL

BACKGROUND OF THE INVENTION

The present invention relates to a method of treating insoluble organic solid material, that contains contaminating material, to oxidize the organic material and isolate the contaminating material, and more particularly is directed to such a method wherein ultraviolet light and ozone are simultaneously applied to accomplish the oxidation of the insoluble organic solid material.

Prior art methods have been developed for breaking down soluble organic material in water by the application of ozone and ultraviolet light, with the ultraviolet light serving to enhance appreciably the oxidation rate accomplished by the ozone. Such methods have been used with success in purifying waste water from sewers and for other related purposes, but such prior art processes have been limited to treatment of soluble organic material and have not been considered appropriate for treatment of insoluble organic solid material, and, therefore, have not been used to treat materials such as resins impregnated with radioactive waste from nuclear facilities and other types of contaminated solid materials.

In contrast, the present invention is directed to treatment of insoluble organic solid materials capable of a wide range of important applications. For example, radioactive heavy metal waste from nuclear facilities is presently circulated in water through organic resins that separate into the resin the radioactive contaminant material from the water and the then contaminated resin is permanently stored, requiring an ever increasing storage area for handling the continuing quantities of waste being developed by nuclear facilities. No acceptable treatment, particularly oxidation, of the contaminated resin has been accomplished effectively in the prior art to reduce the volume of permanent storage requirements. However, the present invention teaches the treatment of a contaminated organic resin to oxidize the resin and thereby separate out heavy metals and other contaminants either as precipitates, in the case of insoluble contaminants, or into solution, in the case of soluble contaminants, or as an escaping gas, in the case of contaminants that oxidize into a gas.

The method of the present invention is also applicable to treatment of insoluble organic solid materials other than resins, such as biological matter, i.e. animal tissue and plant matter, and to the separating of various inorganic and other materials in addition to radioactive materials.

SUMMARY OF THE INVENTION

Briefly described, the method of the present invention involves feeding of contaminated insoluble organic solid material into a body of water and simultaneously applying ultraviolet light and ozone to the water while agitating the water to distribute the ozone therein. The application of ultraviolet light and ozone while agitating continues for a sufficient time to oxidize the organic material substantially into water and carbon dioxide, thereby leaving the contaminating material as either soluble material in solution in the water or as precipitated insoluble material or as both. In some instances the contaminating material may be a material that oxidizes to form soluble and gaseous material, in which case the resulting product will at least partially be discharged from the water as a gas. The method can be carried out either by batch feeding the organic material and continuing the application of ultraviolet light and ozone until the organic material has substantially completely oxidized or the method can be carried out by a continuous feeding of the organic material at a rate in relation to the intensity of the ultraviolet light and the rate of application of ozone to cause substantial oxidation of the continuously fed organic material.

In the preferred embodiment of the present invention the insoluble organic solid material is either an organic resin or biological matter and the contaminating material is inorganic, such as radioactive heavy metal waste from a nuclear facility, or it could be or include such materials as tritium or carbon.

The ultraviolet light is preferably between 10 and 100 kilowatts in intensity and the ozone is sparged into the water at a rate of from 2 to 4 grams per gram of organic resin. In the batch method, the application of ultraviolet light and ozone is continued preferably for from 48 to 96 hours.

DETAILED DESCRIPTION OF PREFERRED EMBODIMENTS

According to the preferred embodiments of the present invention the method is practiced by feeding an insoluble organic solid material in the form of an organic resin in one embodiment or as biological matter in another embodiment. These organic materials may contain contaminating material such as radioactive waste from a nuclear facility in the first embodiment or radioactive material from treatment of animal or plant tissue in a laboratory or medical facility in the second embodiment.

In either of the aforementioned embodiments the insoluble organic solid material containing the contaminating material is fed into a vessel of any suitable type containing water and to which ultraviolet light and ozone, preferably by sparging, are applied while the water is being agitated to distribute the ozone. The ozone is used for the purpose of oxidizing the organic resin material or biological material, which, being organic, disintegrates on oxidation substantially into water and carbon dioxide, leaving substantially no resin or biological material after treatment by the ultraviolet light and ozone for a prescribed period of time. The carbon dioxide, of course, simply escapes to the atmosphere without any harmful effect and similarly at least a portion of the resulting water evaporates and escapes without harm as a result of the heat generated by the system. This leaves the contaminating material in the vessel either as a precipitate, as in the case of the major portions of heavy metals, or in solution in the water, as in the case of at least a small portion of most heavy metals, or the contaminating material may itself be oxidized into a soluble gaseous form, a portion of which will escape as gas and the remainder remain in solution.

The water can then be handled or treated to separate it substantially from the precipitated contaminating material and by evaporation or distillation substantially separated from the soluble contaminating material. The separated water, which may still contain small portions of the soluble contaminating material can be reused in the method as it is not necessary to start with completely uncontaminated water and the same water without concern for small concentrations of contaminating material therein can be reused repeatedly and does not have to be disposed of.

The only permanent disposal that is required is of the highly concentrated resultant contaminating material in the form of the precipitated material or the material left from evaporation or distillation, which concentrated contaminating material will be in a substantially reduced volume as compared with that of the original organic resin or biological material, making the permanent disposal significantly easier and importantly with a reduction in approximately the same order of magnitude in the area needed for permanent storage.

The space needed for permanent storing of radioactive waste material, particularly that from nuclear facilities, is rightfully of increasing concern and heretofore has involved the separating of radioactive material from the waste water into organic resin materials for easier handling and storage, but the resin material itself constitutes a substantial portion of the volume of the material that must ultimately be stored, thus requiring substantially more permanent storage space than that needed for the contaminating material itself. On the other hand, the present invention eliminates substantially the large volume of resin or carrier material from the total material that must be stored, such that a space that would now be required to store the radioactive waste of one year of operation of a nuclear facility could be used to store the waste for as much as 100 years. For example, the contaminating material resulting from the method of the present invention can be handled as a solid and sealed in a lead or other shielding container or could be used in the form of a briney sludge with some of the remaining water that has not been completely removed and mixed in cement to form concrete as the permanent storage medium.

Significantly, the concentrated contaminating material resulting from the method of the present invention need not be permanently stored at all as it could be used for medical purposes or for research and could have wide application in commercial or domestic heating of air or water such as by heating hot water for use commercially or domestically and in heating water that is used for heating of air in residences or commercial buildings. For example, the material in salt form could be coated on lead tubes in an arrangement in which oxygen is passed through the array and would be bombarded by the gamma rays from the radioactive material to form ozone while at the same time generating heat that can be applied to advantage. The resulting ozone can be used in the method of the present invention or it could be used for other purposes, such as to purify domestic and industrial waste waters. In some cases, the radioactive soilds separated by the present invention could be reused for their original purpose, in which case no disposal would be necessary.

The organic resin used in the aforementioned first embodiment of the present invention is preferably a conjugated polymer, such as a substituted polystyrene or substituted polyacrylate. Such substituted polystyrene or polyacrylate could be sulfonated, phosphorylated, carboxylated, hydroxylated, an amine (primary, secondary or tertiary) or any other recognized suitable substituted material. One sulfonated polystyrene copolymer that has been used with success is that sold by Fisher Scientific under the brand name REXYN 101(H), which is in the form of beads.

The composition of the organic resin that can be treated by the method of the present invention is not limited by the present invention and may be any resin that has been selected to best separate out the contaminating material from the waste water of the previously performed operation that results in such contaminating material.

Typically, the contaminating material from a nuclear facility or from a laboratory or medical facility that uses radioactive equipment for treatment would include such radioactive heavy metals as iron ($Fe^{59}$), cobalt ($Co^{60}$), cesium ($Cs^{137}$), lithium, manganese, uranium, copper, nickel, sodium, potassium, iodine or zinc, which are inorganic substances. Also, some other contaminants, such as tritium ($H_3$) or carbon (for example $C^{12}$, $C^{13}$ or $C^{14}$) may be treated by the method of the present invention.

When the contaminant is iron, cobalt, manganese, uranium, copper, nickel or zinc, the major portion of each is precipitated by the present invention as a solid that can be readily separated physically from the water, while varying portions of these materials may remain in solution, in some cases the amount in solution may be so minimal as not to require further treatment or it may be substantial enough to indicate further treatment by evaporation, distillation or other methods to separate the bulk of the contaminant from the remaining water. Contaminants such as cesium, lithium, sodium, potassium and iodine are soluble in water and will require evaporation or distillation for separation at least to reduce the concentration in the remaining water to a level at which the water can be reused in the method. In the case of materials such as tritium and carbon, the contaminant will form both a gaseous and a soluble product, with the gaseous product readily separating from the water and the soluble portion, separated by evaporation or distillation. Any other commercially available form of separation of the contaminants from the water can be used within the scope of the present invention.

The application of ozone to the water medium containing the organic material to oxidize it and substantially disintegrate it is the primary function of the method of the present invention. The ozone is sparged or bubbled into the water in the vessel and the water is agitated so that at least a portion of the ozone is dissolved in the water for efficient oxidation of the organic material and the remaining portion of the ozone will remain as bubbles for action directly on the organic material.

As is known, ultraviolet light facilitates and enhances the oxidation action of ozone and has an incidental heating effect that causes evaporation of some of the quantity of water, which is increasing by the development of water as a product of oxidation of the organic material. Depending on the manner in which the treatment occurs, it is possible to develop sufficient heat from the ultraviolet light as well as heat from oxidation to cause evaporation of substantially the same amount of water as is developed by the oxidation of the organic material, and as the other primary result of oxidation is gaseous carbon dioxide, it is possible to obtain an equilibrium state in which there is no increase of liquid or solid in the system resulting from the quantity of resin being fed, except, of course, for the contaminants themselves.

The method of the present invention is adaptable to a closed circuit recirculation system in which the water from the vessel in which the material is being treated hereby is continuously drained and further treated as necessary to remove major portions of soluble contaminants to provide water with a low level of concentration of contaminants, which low level contaminated water picks up contaminated resin and carries it to the treatment vessel or is recirculated directly to the treatment vessel with the contaminated resin fed continuously into the water that is already in the vessel.

In the preferred form of the method of the present invention, ozone is supplied in the quantity of one to six grams for each gram of resin, preferably two to four grams of ozone per gram of resin. The ozone is introduced to the water through a sparger and the water is agitated to disperse the ozone in the water. Ultraviolet light of an intensity of at least approximately 10 watts sufficient to activate the reaction is applied. In a batch process the ozone and ultraviolet light are applied while the water is being agitated over a period of from 48 to 96 hours. The time of batch operation can vary depending on the size of the particles of the resin, the smaller the mesh size of the particles the shorter the time for reaction. Also, the time of operation is dependent on the rate of application and the intensity of the ultraviolet light source. In large scale commercial operations it is contemplated that a light source of 100s or 1000s of kilowatts may be used with commensurate volumes of ozone to oxidize corresponding large volumes of resin in batch or continuous operations.

The following Examples illustrate the preferred embodiments of the present invention:

EXAMPLE I

Ten liters of water were placed in a vessel with the water level 15 inches deep. The vessel contained a 10 watt ultraviolet light source. An agitator was mounted for rotation near the bottom of the vessel and a sparger was disposed in the bottom of the vessel for dispensing ozone from a source at a rate of approximately 1½ liters per minute. Fifty grams of REXYN 101(H) sulfonated polystyrene copolymer that had been saturated with iron, cobalt, nickel, copper and zinc was fed to the water and ozone was applied through the sparger at the rate of approximately 1½ liters per minute to provide approximately 100 to 200 grams of ozone during the operating cycle. The application of ozone and ultraviolet light with agitation of the water was continued for 96 hours, at which time the water that had a dark appearance from the presence of the organic resin changed suddenly to the appearance of clear water with precipitated material appearing in the bottom of the vessel. It was found that the bulk of the quantity of the metals originally contained in the resin precipitated out and were easily removed from the bottom of the vessel and the remaining water contained only traces of some of the metal and small quantities of other of the metals in solution. This Example was practiced for safety reasons with metal that was not radioactive, but the significant separation results and substantially complete oxidation of the resin that was obtained would be applicable as well to separation of radioactive metal.

EXAMPLE II

The same method as practiced in Example I could be performed using biological material in the form of waste animal tissue containing contaminants in the form of iron, copper, zinc, cobalt, iodine and nickel, which when fed into the aforementioned container and treated by the ozone and ultraviolet light while the water is agitated would within the period of 48 to 96 hours break down by oxidation of the biological material to leave the metals primarily as precipitates with portions in solution. While this Example has not been performed, it is contemplated that excellent results would be obtained on the same basis as in Example I.

EXAMPLE III

The treatment method described for Example II could be carried out using biological material in the form of body tissue as waste from radioactive treatment of patients in a medical facility. The contaminants in the biological material could include organically bound tritium ($H^3$) and/or carbon ($C^{14}$). Upon following the procedure recited for Example II, the biological material will break down in the same manner and the tritium and carbon will oxidize into carbon dioxide and volatile organics and water. Evaporation or distillation of the liquid will release the tritium and carbon to the atmosphere. As in the case of Example II, the method of Example III has not been performed in practice, but excellent results are contemplated on the same basis as for Example I.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A method of treating insoluble organic solid resin material, that contains a contaminating material, to oxidize said organic material and isolate said contaminating material, comprising feeding said contaminated insoluble organic solid material into a body of water, simultaneously applying ultraviolet light and ozone to said water while agitating said water to distribute said ozone therein, continuing said applying of ultraviolet light and ozone while agitating said body of water for sufficient time to oxidize said organic material substantially into water and carbon dioxide, thereby leaving said contaminating material as either soluble material in solution in said water or as precipitated insoluble material or as both.

2. A method of treating insoluble organic solid resin material according to claim 1 and characterized further by separating a substantial portion of said contaminating material from said water by physically removing said precipitated material or by processing said water to remove said soluble material.

3. A method of treating insoluble organic solid resin material according to claim 1 and characterized further by batch feeding of said organic material to said water, and applying said ultraviolet light at sufficient intensity and said ozone in sufficient quantity and for a sufficient period of time to cause substantial oxidation of said batch of organic material.

4. A method of treating insoluble organic solid resin material according to claim 1 and characterized further by feeding said organic material continuously into said body of water, and controlling the relation between the rate of said feeding, the intensity of said ultraviolet light and the rate of said application of ozone to cause substantial oxidation of said continuously fed organic material.

5. A method of treating insoluble organic solid resin material according to claim 1, 3 or 4 and characterized further in that said organic resin material is a conjugated polymer.

6. A method of treating insoluble organic solid resin material according to claim 5 and characterized further in that said conjugated polymer is a substituted polystyrene.

7. A method of treating insoluble organic solid resin material according to claim 5 and characterized further in that said conjugated polymer is a substituted polyacrylate.

8. A method of treating insoluble organic solid resin material according to claim 1, 3 or 4 and characterized further in that said organic resin material is biological matter.

9. A method of treating insoluble organic solid resin material according to claim 1, 3 or 4 and characterized further in that said contaminating material is an inorganic material.

10. A method of treating insoluble organic solid resin material according to claim 9 and characterized further in that said inorganic material includes at least either iron, cobalt, cesium lithium, manganese, uranium, copper, nickel, sodium, potassium, iodine or zinc.

11. A method of treating insoluble organic solid resin material according to claim 1, 3 and 4 and characterized further in that said contaminating material is an inorganic material including at least either iron, cobalt, cesium, copper, nickel, iodine or zinc.

12. A method of treating insoluble organic solid resin material according to claim 1, 3 or 4 and characterized further in that said contaminating material is radioactive.

13. A method of treating insoluble organic solid resin material according to claim 12 and characterized further in that said radioactive material is the waste product of a nuclear facility.

14. A method of treating insoluble organic solid resin material according to claim 1, 3 or 4 and characterized further in that said ozone is applied at the rate of 2–4 grams per gram of organic resin, and said ultraviolet light is applied at an intensity of at least approximately 10 watts sufficient to activate the reactor.

15. A method of treating insoluble organic solid resin material according to claim 14 and characterized further in that said ozone is applied by sparging.

16. A method of treating insoluble organic solid resin material according to claim 1, 3 or 4 and characterized further in that said ozone is applied by sparging.

17. A method of treating insoluble organic solid resin material according to claim 3 and characterized further in that said ozone is applied at the rate of 2–4 grams per gram of organic resin, said ultraviolet light is applied at an intensity of at least approximately 10 watts sufficient to activate the reaction, and said application of ozone and ultraviolet light is continued for from 48 to 96 hours.

18. A method of treating insoluble organic solid resin material, that contains a contaminating material, to oxidize said organic resin material and separate said contaminating material, comprising feeding said contaminated insoluble organic solid resin material into a body of water, simultaneously applying ultraviolet light and ozone to said water while agitating said water to distribute said ozone therein, continuing said applying of ultraviolet light and ozone while agitating said body of water for sufficient time to oxidize said organic resin material substantially into water and carbon dioxide, said contaminating material being a material that oxidizes to form soluble and gaseous material.

19. A method of treating insoluble organic solid resin material according to claim 18 and characterized further in that said contaminating material includes either or both tritium and carbon.

* * * * *